(12) United States Patent
Ohmori

(10) Patent No.: US 7,436,941 B2
(45) Date of Patent: Oct. 14, 2008

(54) PLURAL-COMMUNICATION-LINE-CONTAINING APPARATUS, COMMUNICATION LINE NAMING PROGRAM, COMMUNICATION LINE SELECTION APPARATUS, AND COMMUNICATION LINE SELECTION PROGRAM

(75) Inventor: Seiji Ohmori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1437 days.

(21) Appl. No.: 10/232,663

(22) Filed: Sep. 3, 2002

(65) Prior Publication Data

US 2003/0053125 A1     Mar. 20, 2003

(30) Foreign Application Priority Data

Aug. 31, 2001   (JP)   ............................. 2001-264709

(51) Int. Cl.
    *H04M 11/00*   (2006.01)
(52) U.S. Cl. ............................ 379/100.12; 379/100.01
(58) Field of Classification Search ............ 379/100.12, 379/100.14, 93.07; 358/442
    See application file for complete search history.

(56) References Cited

U.S. PATENT DOCUMENTS 5,719,688 A * 2/1998 Kagami ...................... 358/468
6,122,072 A   9/2000 Matsui et al. ................ 358/434
6,614,892 B1 * 9/2003 Hashimoto et al. ...... 379/100.12

FOREIGN PATENT DOCUMENTS

| JP | 5-022055 | 1/1993 |
| JP | 06-164760 A | 6/1994 |
| JP | 09-116721 A | 5/1997 |
| JP | 11-098274 A | 4/1999 |
| JP | 2000-92230 A | 3/2000 |

* cited by examiner

*Primary Examiner*—Stella Woo
(74) *Attorney, Agent, or Firm*—Fitzpatrick, Cella, Harper & Scinto

(57) ABSTRACT

A plural-communication-line-containing apparatus capable of containing plural communication lines comprises: a communication-line-type discriminator for discriminating a type of communication line; a communication-line-number counter for counting the number of communication lines for each type of communication line; a communication-line-name determiner for determining a communication line name on the basis of the discriminated type of communication line and the counted number of communication lines; and a communication-line-name display for displaying the determined communication line name. Thus, in the plural-communication-line-containing apparatus capable of being connected with the plural communication lines, the names of the communication lines can be appropriately displayed and an operator can easily discriminate the communication lines.

24 Claims, 7 Drawing Sheets

PLURAL-COMMUNICATION-LINE-CONTAINING APPARATUS, COMMUNICATION LINE NAMING PROGRAM, COMMUNICATION LINE SELECTION APPARATUS, AND COMMUNICATION LINE SELECTION PROGRAM

BACKGROUND OF THE INVENTION

1. Field of the Invention

The present invention relates to an apparatus such as a facsimile apparatus or the like containing plural (i.e., plural) communication lines (called a plural-communication-line-containing apparatus), an image forming apparatus, a communication line selection apparatus, and a communication line selection program.

2. Related Background Art

Conventionally, in a facsimile apparatus with which plural communication lines can be connected, respective communication line numbers are displayed at a time of operation or on a communication administration report so that an operator can discriminate each communication line.

Moreover, in a conventional facsimile apparatus, a name of a communication line is displayed like "extension" or "outside line" in accordance with a type of communication line.

Moreover, there is an apparatus that an operator can select one of plural connected communication lines by appropriately depressing one of line selection keys provided in correspondence with the number of communication lines.

Moreover, in a facsimile apparatus containing a telephone line for facsimile communication and a communication line for an electronic mail or a facsimile apparatus connectable with both a telephone line for facsimile communication and a communication line for an electronic mail, a key for selecting whether the facsimile communication or the electronic mail is provided and an operator can select either the facsimile communication or the electronic mail by depressing the key.

However, in the above conventional apparatuses, there is a problem that, only by displaying the communication line number, it is difficult to discriminate what type of communication line the line in question is.

Moreover, even if "extension" or "outside line" is displayed, a user does not necessarily use the same line as that displayed, that is, the display might be unsuitable for an actual operation. This causes confusion when the operator discriminates the communication line.

That is, in the above conventional cases, there is a problem that the communication line name can not be appropriately displayed in a plural-communication-line-containing apparatus capable of being connected with the plural communication lines, and thus the operator can not easily discriminate the communication line.

Moreover, even where the communication line is selected, the key for selecting either the facsimile communication or the electronic mail, the keys corresponding to the respective communication lines and also the key for selecting the telephone line are unnecessary for a user who does not use an electronic mail. Thus, the plural unnecessary keys exist on an operation panel, and this causes confusion in the operation. Moreover, for a user who uses only one line, the keys for the other lines are unnecessary.

On one hand, when a user who uses the plural facsimile communication lines and the electronic mail line performs the communication, this user is troubled because it is necessary to change the key between the facsimile communication and the electronic mail even though the operation method is almost common in either communication.

Moreover, when the line can be selected even in the case where each line is not connected or can not be used, it causes a trouble that the communication can not be actually performed.

The above problems are the problems which occur in the plural-communication-line-containing apparatus other than the facsimile apparatus.

SUMMARY OF THE INVENTION

An object of the present invention is to provide a plural-communication-line-containing apparatus capable of being connected with plural communication lines, on which names of the communication lines can be appropriately displayed and an operator can easily discriminate the communication lines.

Another object of the present invention is to provide a communication line selection apparatus on which an operator can select a usable communication line without confusion in a communication line selection operation.

In the embodiment of the present invention, it is characterized by providing a communication apparatus capable of containing plural communication lines, comprising: a communication-line-type discriminating means for discriminating a type of each communication line connected; a communication-line-number counting means for counting the number of same type of communication lines for each type of communication line; a communication-line-name determining means for determining a communication line name on the basis of the type of communication line discriminated by the communication-line-type discriminating means and the number of same type of communication lines counted by the communication-line-number counting means; and a communication-line-name displaying means for displaying the communication line name determined by the communication-line-name determining means.

Moreover, in the embodiment of the present invention, it is characterized by providing a communication apparatus capable of connecting with plural communication lines for facsimile communication and a LAN communication line, comprising: a communication line selecting key for selecting the communication line; and a communication line selecting means for selecting one communication line from among the plural communication lines for facsimile communication and a LAN communication line, according to that an operator depresses the communication line selecting key in a communication operation, wherein the communication line selecting means selects another communication line from among the plural communication lines for facsimile communication and a LAN communication line according to that the operator further depresses the communication line selecting key.

Other objects and the features of the present invention will be become apparent from the following specification.

DETAILED DESCRIPTION OF THE PREFERRED EMBODIMENTS

Figure 1:
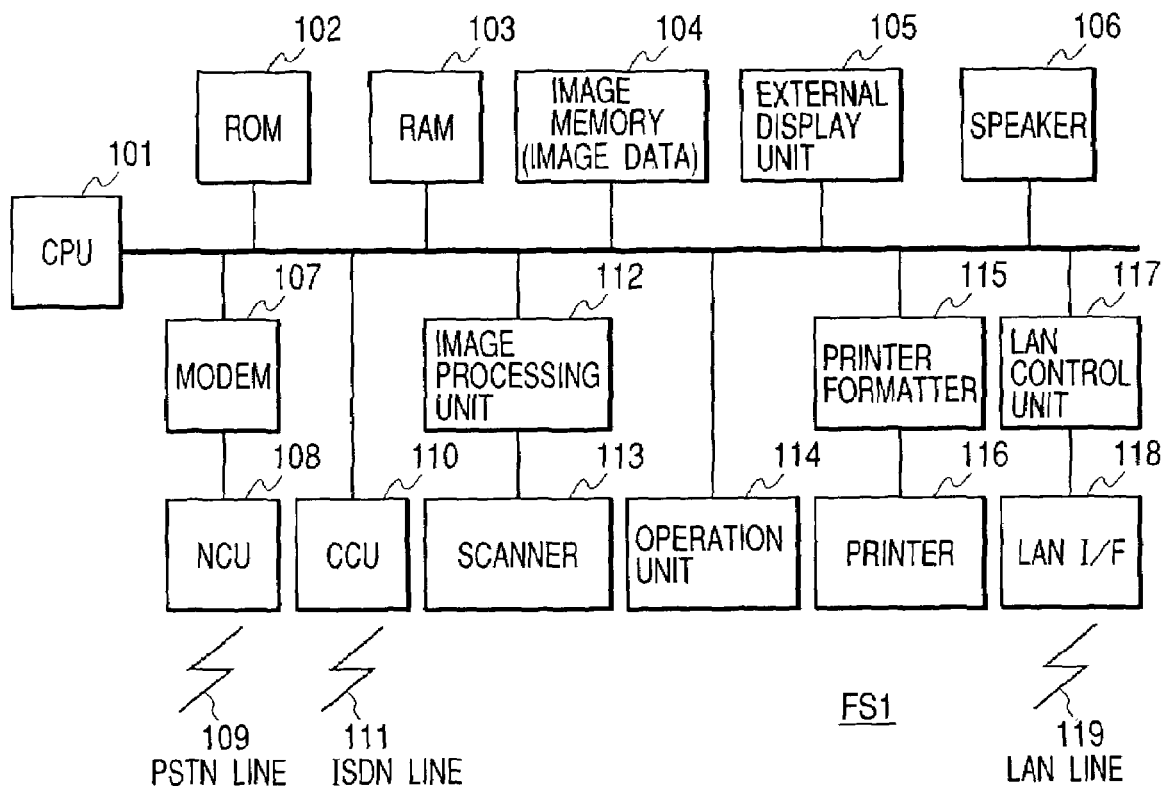
FIG. 1 is a block diagram showing the structure of a facsimile apparatus FS1 according to the first embodiment of the present invention.

FIG. 1 is a block diagram showing the structure of a facsimile apparatus FS1 according to the first embodiment of the present invention.

In the facsimile apparatus FS1, a CPU 101 is a system controlling unit which controls the overall apparatus, a ROM 102 stores control programs for the CPU 101, and a RAM 103 which is composed by an SRAM (static RAM) and the like stores program control variables and the like. Also, various setting values such as a transmission destination telephone number, a communication line name, a communication line naming method and the like registered by an operator, administration data and the like of the apparatus, and various working buffers are stored in the RAM 103.

A memory (image memory) 104 which is composed of a DRAM (dynamic RAM) and the like stores and accumulates image data, and an external display unit 105 which is composed of an LCD, an LED or the like displays notification to a user. A speaker 106 gives notification and warning to the user by sound, and monitors a signal sound transmitted and received through a PSTN communication line 109 or an ISDN communication line 111.

A modem 107 modulates and demodulates transmission and reception signals of the facsimile apparatus FS1, and an NCU (Network Controlling Unit) 108 has the function to send a selection signal (dial pulse or tone dialer) to the PSTN communication line (analog public communication line network) 109. The NCU 108 also performs an automatic reception operation by detecting a calling signal.

A CCU (Communication Controlling Unit) 110 performs communication line control to connect with the ISDN communication line (integrated digital communication network) 111, an image processing unit 112 performs a correction process to the read image data and outputs high-definition image data, and a scanner 113 which is composed of a CS image sensor, a sheet feeding mechanism and the like optically reads an original and then converts the read original into electrical image data.

An operation unit 114 which is composed of a keyboard, a touch panel or the like is used when the operator performs various input operations, and a printer formatter 115 analyzes a printer description language and converts the analyzed language into image data when file data sent from an external apparatus such as a PC, a work station or the like is printed. A printer 116 is the apparatus which records the received image and the file data on a recording sheet.

A LAN I/F 118 is the interface which connects the facsimile apparatus FS1 with a LAN communication line 119 through which an electronic mail and the like can be exchanged, and which is controlled by a LAN controlling unit 117.

It should be noted that the modem 107, the NCU 108, the CCU 110, the LAN controlling unit 117 and the LAN I/F 118 are detachably mounted on the facsimile apparatus FS1. That is, if the LAN controlling unit 117 and the LAN I/F 118 are removed from the facsimile apparatus FS1, it works as the facsimile apparatus FS1 which includes only two communication lines of the PSTN communication line and the ISDN communication line. Then, if the CCU 110 is further removed, it works as the facsimile apparatus FS1 which includes only one communication line of the PSTN communication line.

In the present embodiment, it is assumed that one PSTN communication line, one ISDN communication line and one LAN communication line are provided. However, with the facsimile apparatus FS1, can be connected plural PSTN communication lines, plural ISDN communication lines and plural LAN communication lines. That is, the plural modems 107, the plural NCU's 108, the plural CCU's 110, the plural LAN controlling units 117 and the plural LAN I/F's 118 can be connected with the facsimile apparatus FS1, respectively. For example, it is possible to constitute an apparatus of three PSTN communication lines (i.e., there is no ISDN communication line and LAN communication line), or an apparatus of two PSTN communication lines, two ISDN communication lines and two LAN communication lines.

Next, an operation of the facsimile apparatus FS1 will be explained.

Figure 2:
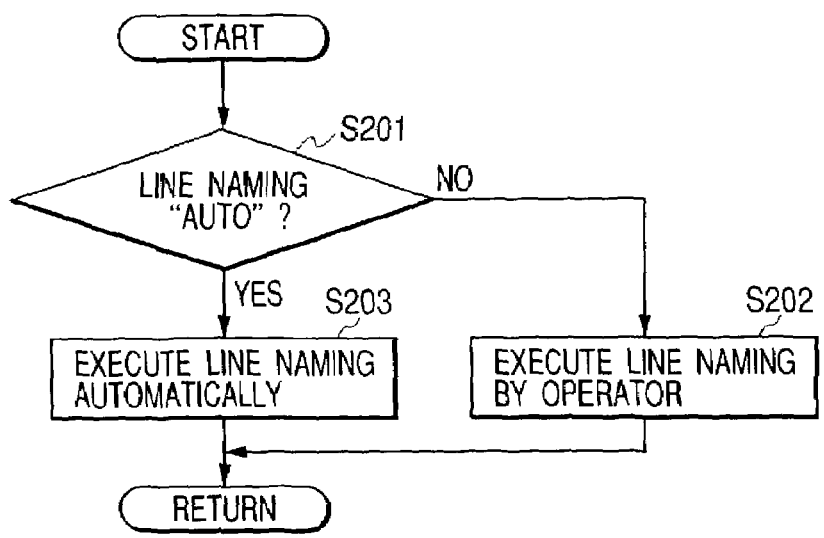
FIG. 2 is a flow chart showing an operation to determine names of communication lines connected with the facsimile apparatus FS1.

FIG. 2 is a flow chart showing the operation to determine names of the communication lines connected with the facsimile apparatus FS1.

The three types of communication lines, i.e., the PSTN communication line, the ISDN communication line and the LAN communication line, can be connected with the facsimile apparatus FS1. Here, the PSTN communication line and the ISDN communication line are the communication lines used for the facsimile communication, and the LAN communication line is used for transmission and reception of the electronic mail using a protocol of TCP/IP (Transmission Control Protocol/Internet Protocol) or the like and the communication using a protocol of FTP (File Transfer Protocol), HTTP (HyperText Transport Protocol) or the like.

In the facsimile apparatus FS1, the operator can previously select the method to determine the name of the communication line from between "auto" and "fixed". If the operator selects the "fixed" method, an arbitrary character string representing the communication line name can be registered for each communication line. For example, if the two communication lines are connected as the PSTN communication line and the ISDN communication line, respectively, it is possible to register a character string "extension" to the PSTN communication line and a character string "outside line" to the ISDN communication line, and store the setting contents in the RAM 103.

In the facsimile apparatus FS1, the state on communication, the transmission setting, the various settings for the respective communication lines and the like are displayed on the external display unit 105. At this time, the communication line name is displayed so that the operator can discriminate each communication line. Besides, when the information such as the communication result and the like is printed on the recording sheet and then output by the printer 116, the communication line name is displayed so that the operator can discriminate each communication line.

Here, it is necessary to determine the name of each communication line before the communication line name is displayed on the external display unit or the recording sheet, and this line naming operation will be explained hereinafter.

First, it is discriminated whether the communication line naming method is set to the "auto" method or the "fixed" method (step S201). If discriminated that the naming method is set to the "fixed" method, the character string registered by the operator is set as the communication line name for each communication line (step S202). On the other hand, if discriminated in the step S201 that the naming method is set to the "auto" method, the communication line naming is automatically executed (step S203).

Next, in the embodiment, an operation to discriminate a type of each communication line in case of executing the communication line naming automatically will be explained.

Figure 6:
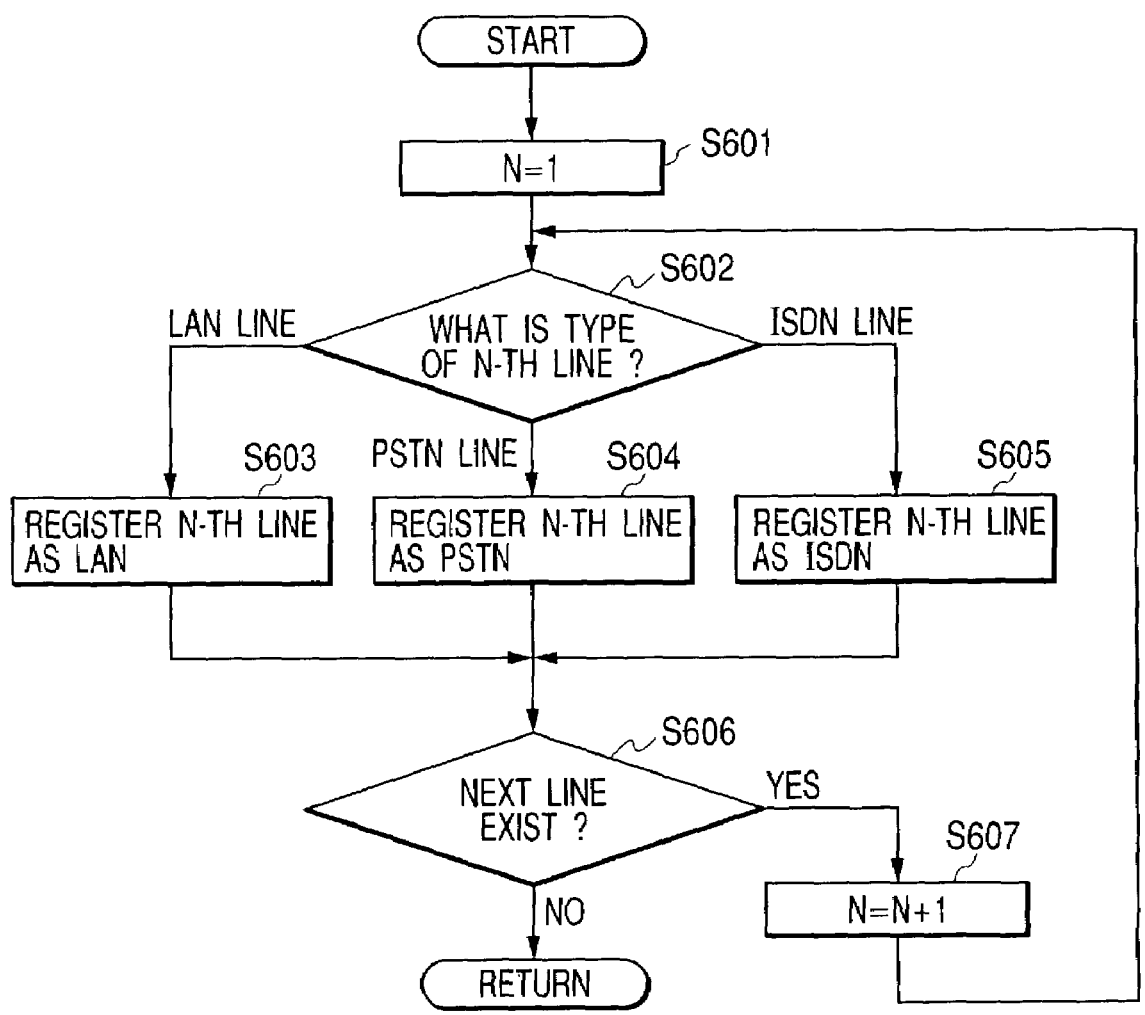
FIG. 6 is a flow chart showing an operation to discriminate each communication line connected with the facsimile apparatus FS1.

FIG. 6 is a flow chart showing the operation to discriminate the type of each communication line connected with the facsimile apparatus FS1.

First, N=1 is set (step S601), and the type of N-th communication line is discriminated (step S602). If the discriminated type is the LAN communication line, the N-th communication line is registered as the LAN communication line (step S603). Likewise, if the discriminated type is the PSTN communication line, the N-th communication line is registered as the PSTN communication line (step S604). Moreover, likewise, if the discriminated type is the ISDN communication line, the N-th communication line is registered as the ISDN communication line (step S605). Then, it is further discriminated whether or not other communication line exists (step S606). If other communication line exists, the communication line in question is set as the (N+1)-th communication line, and also the type thereof is discriminated (step S607). After then, the discrimination is executed in the step S602 until any other communication line does not exist, whereby the types of all communication lines connected with the facsimile apparatus FS1 are discriminated.

In the present embodiment, when it is discriminated whether or not the PSTN communication line is usable, this discrimination is performed according to whether or not the modem 107 exists. When it is discriminated whether or not the ISDN communication line is usable, this discrimination is performed according to whether or not the CCU 110 exists. When it is discriminated whether or not the LAN communication line is usable, this discrimination is performed according to whether or not the LAN controlling unit 117 exists.

However, it is possible to cause the operator to previously set use or disuse for each communication line and then discriminate the usable state based on the set contents. Moreover, it is possible to discriminate the usable state according to whether or not the communication line in question is currently busy.

Figure 3:
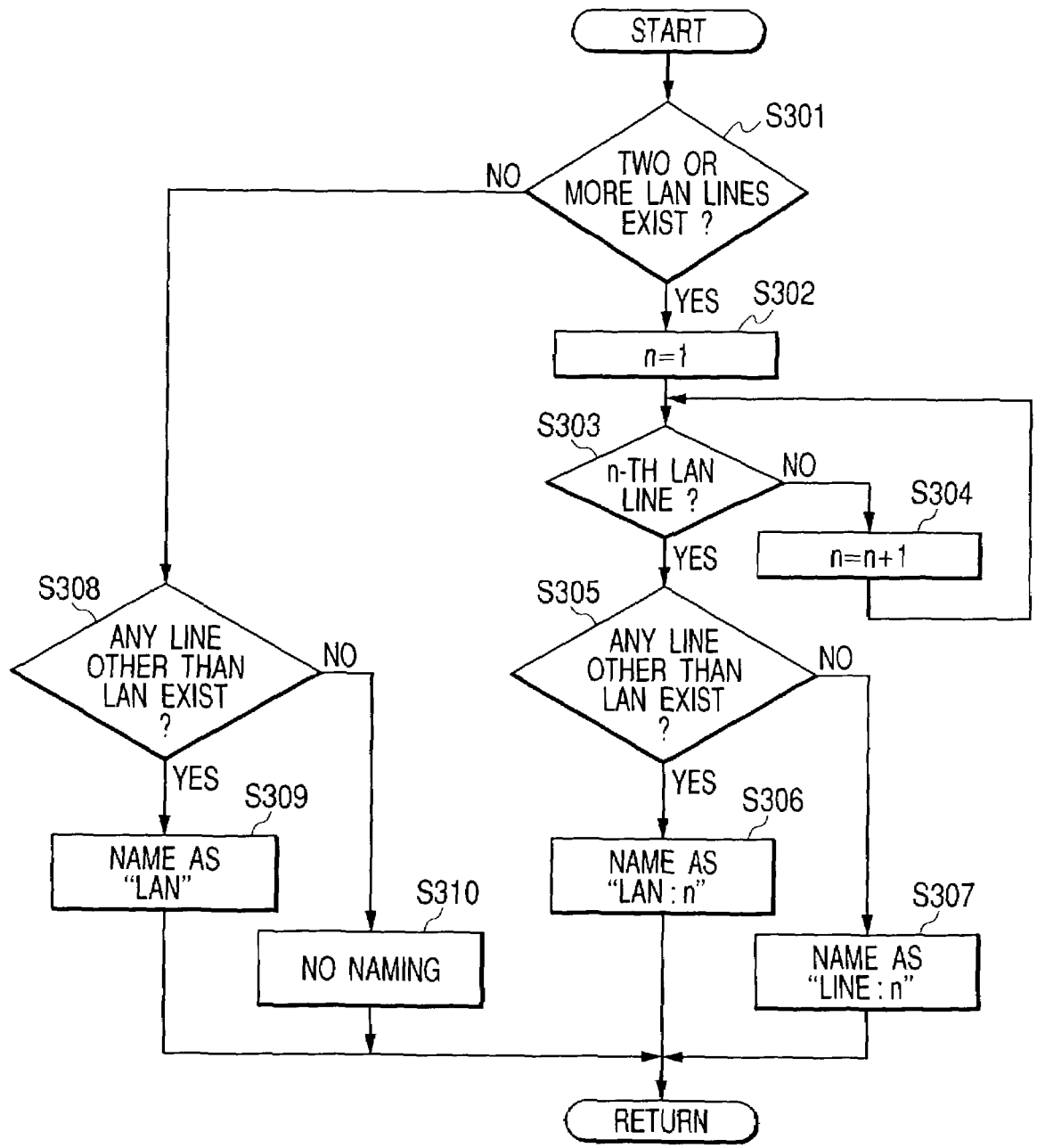
FIG. 3 is a flow chart showing an operation to automatically determine a name of a LAN communication line connected with the facsimile apparatus FS1.

FIG. 3 is a flow chart showing an operation to automatically determine a name of the LAN communication line connected with the facsimile apparatus FS1.

In order to determine the name of one of the LAN communication lines connected with the facsimile apparatus FS1, it is first discriminated based on the type information of each communication line registered according to the flow chart shown in FIG. 6 whether or not the plural LAN communication lines exist (step S301).

Here, if discriminated that the two ore more LAN communication lines exist, then it is further discriminated whether the communication line in question is the communication line of what number. Here, it should be noted that "what number" represents the communication line number to be given as a matter of convenience to discriminate each of the plural LAN communication lines. For example, the line numbers may be given as 1, 2, 3, . . . , in the order closer to the CPU, in the order of higher communication speed, or in the order of the communication line connected with the physically higher position.

To determine the LAN communication line of what number, 1 is first set as a variable n (step S302), and then it is discriminated whether or not the LAN communication line in question is the n-th (i.e., first) communication line (step S303). If the LAN communication line in question is not the n-th communication line, the variable n is increased by one (step S304), and then it is discriminated whether or not the LAN communication line in question is the n-th communication line. This operation is repeated in the step S303 until it is discriminated that the LAN communication line in question is the n-th communication line. If it is discriminated in the step S303 that the LAN communication line in question is the n-th communication line, the flow advances to a next step S305. At this time, the communication line number is stored as the variable n.

In the step S305, it is discriminated whether or not any communication line other than the LAN communication line exists. Then, if discriminated that any communication line other than the LAN communication line does not exist, this means that only the plural LAN communication lines exist in this apparatus, whereby the communication line name is determined as "communication line: n" (step S307). On the other hand, if discriminated in the step S305 that the communication line other than the LAN communication line exists, the communication line name is determined as "LAN: n" (step S306). Here, n is the value of the communication line number discriminated in the steps S302, S303 and S304.

Incidentally, if discriminated in the step S301 that only one LAN communication line exists, like the step S305, it is further discriminated whether or not any communication line other than the LAN communication line exists (step S308).

If discriminated that any communication line other than the LAN communication line does not exist, this means that only one LAN communication line exists in this apparatus and any PSTN communication line and ISDN communication line do not exist.

Therefore, in this case, it is unnecessary to give the communication line name to discriminate the communication line, whereby no naming is executed (step S310). On the other hand, if discriminated in the step S308 that the communication line other than the LAN communication line, the communication line name is determined as "LAN" (step S309).

Next, an operation to determine a name of one of the PSTN communication lines will be explained.

Figure 4:
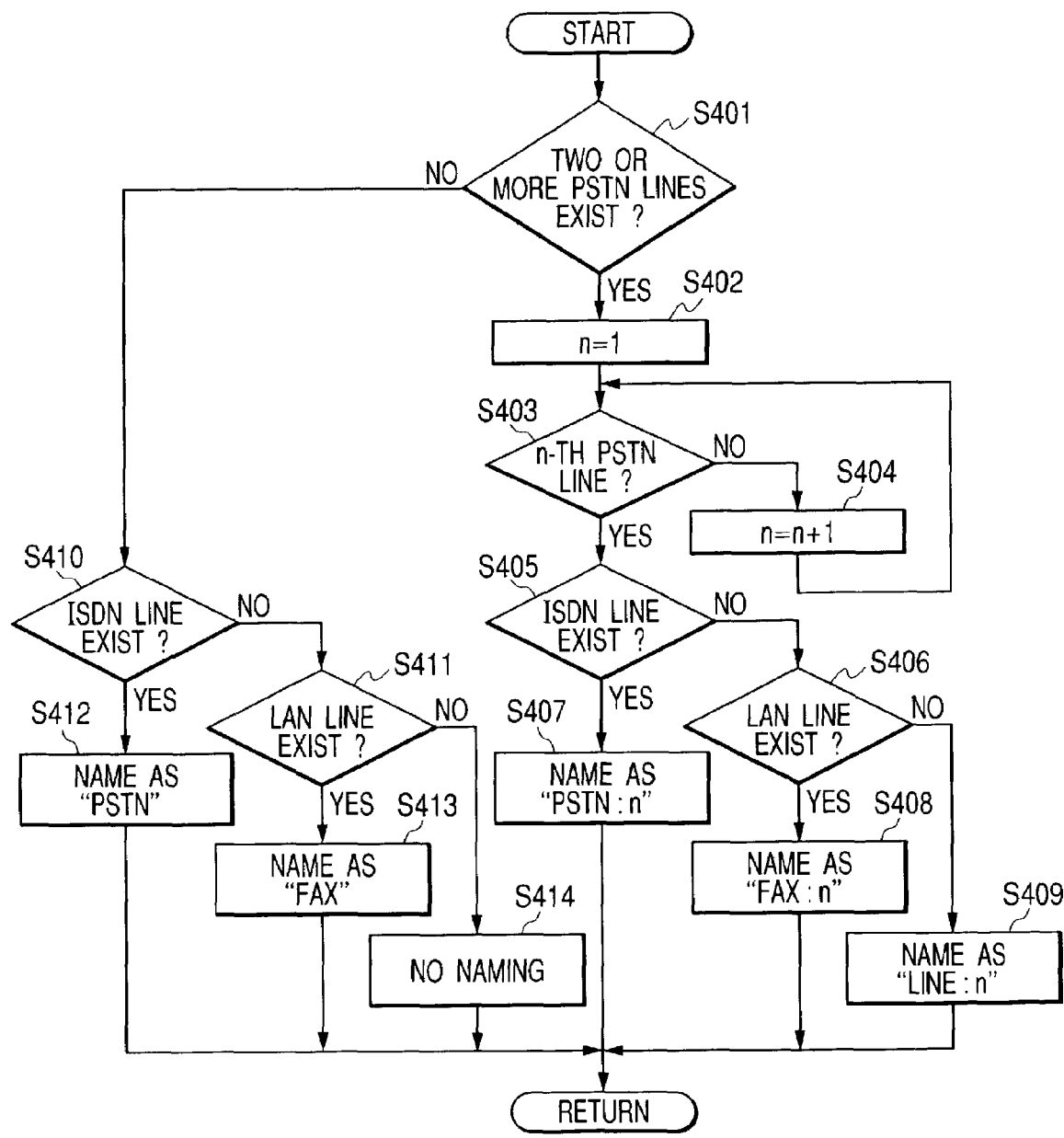
FIG. 4 is a flow chart showing an operation to automatically determine a name of a PSTN (Public Switched Telephone Network) communication line connected with the facsimile apparatus FS1.

FIG. 4 is a flow chart showing the operation to determine the name of one communication line of the PSTN communication lines, in the embodiment.

First, in a step S401, it is first discriminated based on the type information of each communication line registered according to the flow chart shown in FIG. 6 whether or not the plural PSTN communication lines exist.

Here, if discriminated that the two ore more PSTN communication lines exist, then it is further discriminated in steps S402, S403 and S404 whether the PSTN communication line in question is the communication line of what number. Here, it should be noted that, in the steps S402, S403 and S404, the processes same as those in the steps S302, S303 and S304 are performed respectively. However, it is discriminated in the step S303 that the LAN communication line is the n-th communication line, while it is discriminated in the step S403 that the PSTN communication line is the n-th communication line.

Like the case of LAN communication line, when the flow advances to a next step S405, the communication line number is stored as the variable n.

Then, it is discriminated in the step S405 whether or not the ISDN communication line exists. If discriminated that the ISDN communication line exists, this means that the PSTN communication line and the ISDN communication line exist as the communication lines for the facsimile communication in the facsimile apparatus FS1, whereby the communication line name is determined as "PSTN: n" (n is the value of the communication line number) (step S407).

On the other hand, if discriminated in the step S405 that the ISDN communication line does not exist, it is further discriminated whether or not the LAN communication line exists (step S406). If discriminated that the LAN communication line exists, this means that the plural PSTN communication lines as the communication lines for the facsimile communication and the LAN communication line as the electronic mail or the like exist in the facsimile apparatus FS1, whereby the communication line name is determined as "LAN: n" (step S408).

On the other hand, if discriminated in the step S406 that the LAN communication line does not exist, this means that only the plural PSTN communication lines exist but the ISDN communication line and the LAN communication line do not exist, whereby the communication line name is determined as "communication line: n" (step S409).

If discriminated in the step S401 that only one PSTN communication line exists, like the steps S405 and S406, discrimination operations are performed in steps S410 and S411 respectively.

That is, if it is discriminated in the step S410 that the ISDN communication line exists, this means that the ISDN communication line and the PSTN communication line exist in the facsimile apparatus FS1, that is, only one PSTN communication line exists, whereby the communication line name is determined as "PSTN" (step S412).

On the other hand, if discriminated in the step S410 that the ISDN communication line does not exist, it is further discriminated whether or not the LAN communication line exists (step S411). Here, if discriminated that the LAN communication line exists, this means that, in the facsimile apparatus FS1, one PSTN communication line exists as the communication line for the facsimile communication and also the LAN communication line exists, whereby the communication line name is determined as "FAX" (step S413).

If discriminated in the step S411 that the LAN communication line does not exist, this means that only one PSTN communication line exists in the facsimile apparatus FS1, and thus it is unnecessary to discriminate and display the communication line, whereby no naming is executed (step S414).

Next, an operation to determine a name of one of the ISDN communication lines will be explained.

Figure 5:
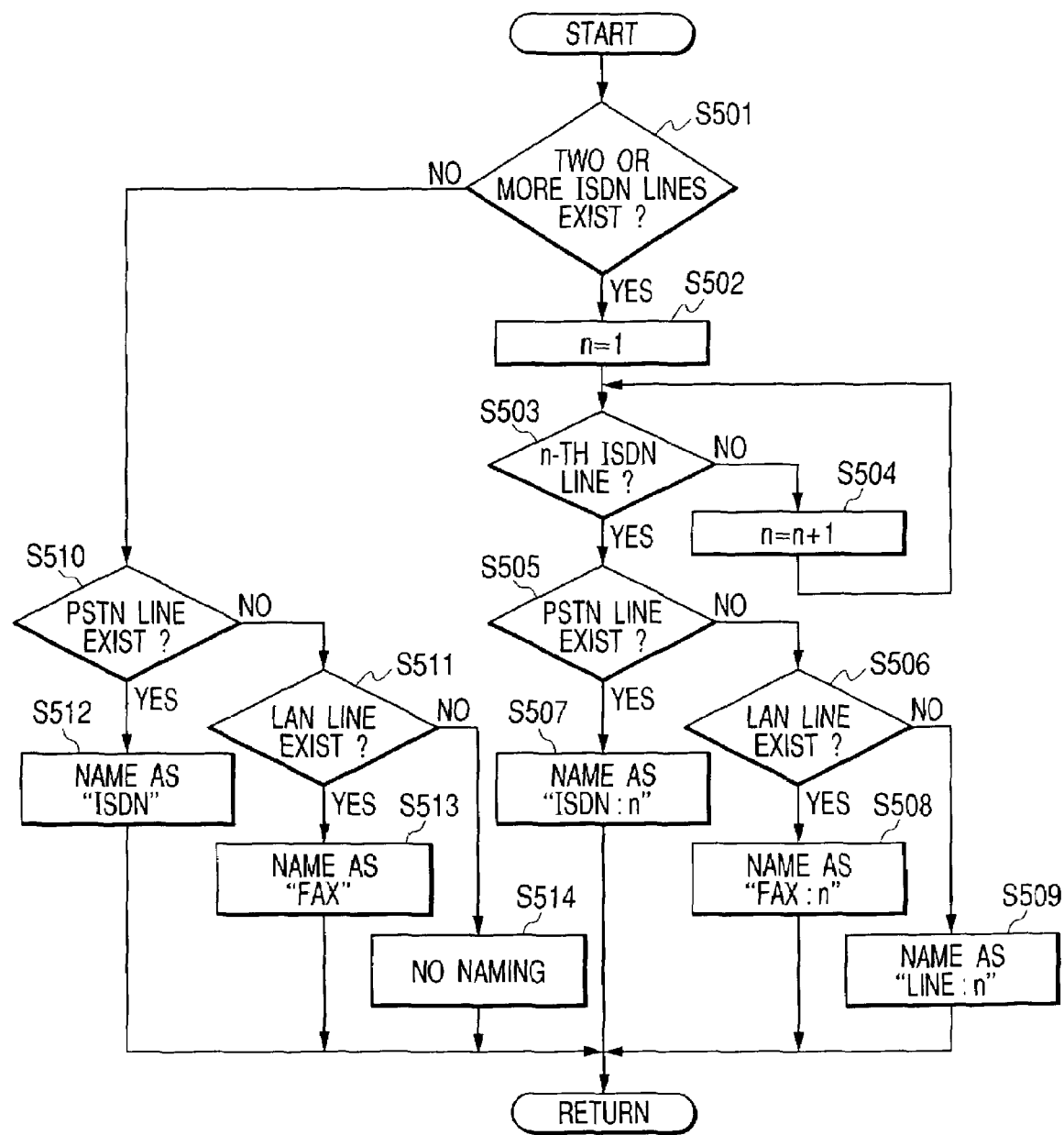
FIG. 5 is a flow chart showing an operation to automatically determine a name of an ISDN communication line connected with the facsimile apparatus FS1.

FIG. 5 is a flow chart showing the operation to determine the name of one communication line of the ISDN communication lines, in the embodiment.

It should be noted that the method to determine the name of the ISDN communication line is basically the same as the method to determine the name of the PSTN communication line.

First, it is first discriminated based on the type information of each communication line registered according to the flow chart shown in FIG. 6 whether or not the plural ISDN communication lines exist (step S501). If discriminated that the two ore more ISDN communication lines exist, then it is further discriminated in steps S502, S503 and S504 whether the ISDN communication line in question is the communication line of what number. Here, it should be noted that, in the steps S502, S503 and S504, the processes same as those in the steps S302, S303 and S304 or in the steps S402, S403 and S404 are performed, respectively.

Next, it is discriminated in a step S505 whether or not the PSTN communication line exists, and it is discriminated in a step S506 whether or not the LAN communication line exists. If discriminated that the PSTN communication line exists, the communication line name is determined as "ISDN: n" (step S507). If discriminated that the PSTN communication line does not exist but the LAN communication line exists, the communication line name is determined as "FAX: n" (step S508). Besides, if discriminated that both the PSTN communication line and the LAN communication line do not exist, the communication line name is determined as "communication line: n" (step S509) Here, it should be noted that, in any case, n is the value of the communication line number.

If discriminated in the step S501 that only one ISDN communication line exists, it is discriminated in a step S510 whether or not the PSTN communication line exists, and it is discriminated in a step S511 whether or not the LAN communication line exists. Then, the communication line name is determined as "ISDN" if the PSTN communication line exists (step S512), and the communication line name is determined as "FAX" if the PSTN communication line does not exist but the LAN communication line exists (step S513). Besides, if both the PSTN communication line and the LAN communication line do not exist, this means that only one ISDN communication line exists in the facsimile apparatus FS1, whereby no naming is executed (step S514).

By the above operation, when the communication line name is automatically determined, the name of each communication line is uniquely determined based on the information representing whether the plural communication lines exist for each type of communication line connected with the facsimile apparatus FS1, and, if the plural communication lines exist, based on the information representing what number the communication line is.

For example, when the three communication lines respectively functioning as the PSTN communication line, the ISDN communication line and the LAN communication line are connected with the facsimile apparatus FS1, the communication line names are determined, respectively, as "PSTN", "ISDN" and "LAN". Besides, when the two communication lines functioning as the PSTN communication lines and the one communication line functioning as the ISDN communication line are connected, the communication line names are determined respectively as "PSTN: 1", "PSTN: 2" and "ISDN". Moreover, when the two communication lines respectively functioning as the one PSTN communication line and the one LAN communication line are connected, the communication line names are determined respectively as "FAX" and "LAN".

The above operation is performed by the CPU 101 on the basis of the program stored in the ROM 102 or the RAM 103. But, such a program as above may be stored in various storage media such as a floppy disk™, a hard disk, an optical disk, a magnetooptical disk, a CD-ROM, a DVD-ROM, a memory card and the like, and is read out and loaded into an information processing apparatus such as a computer or the like or the facsimile apparatus FS1 by using a dedicated reading apparatus to execute the fetched program by the CPU 101.

Moreover, it is possible to apply the above embodiment to a facsimile apparatus in which a copying function, an electronic filing function, a printer function, a data processing function and the like are mixed with the communication function, a communication apparatus separated from a telephone set, a reading circuit and a recording circuit, or data communication control in the information processing apparatus such as the computer or the like.

Moreover, it is possible to apply the above embodiment to how to set and display each communication line name in the apparatus containing the plural communication lines or the like. In this case, by such a method, it is merely required to discriminate the type of communication line, the number of communication lines and the like, and determine the communication line name in the main apparatus, and display the determined name on the display of the handset held in the main apparatus.

Incidentally, conventionally, in the facsimile apparatus having the plural telephone communication lines or the facsimile apparatus capable of being connected with the plural telephone communication lines, it is possible, by providing a key dedicated for selecting the communication line and depressing this key by the operator, to select one telephone communication line from among the plural telephone communication lines.

Moreover, conventionally, in the facsimile apparatus having both the telephone communication line for the facsimile communication and the communication line for the electronic mail or the facsimile apparatus capable of being connected with both the telephone communication line for the facsimile communication and the communication line for the electronic mail, it is possible, by providing a key for selecting whether the facsimile communication or the electronic mail and depressing this key by the operator, to select the facsimile communication or the electronic mail.

Figure 7:
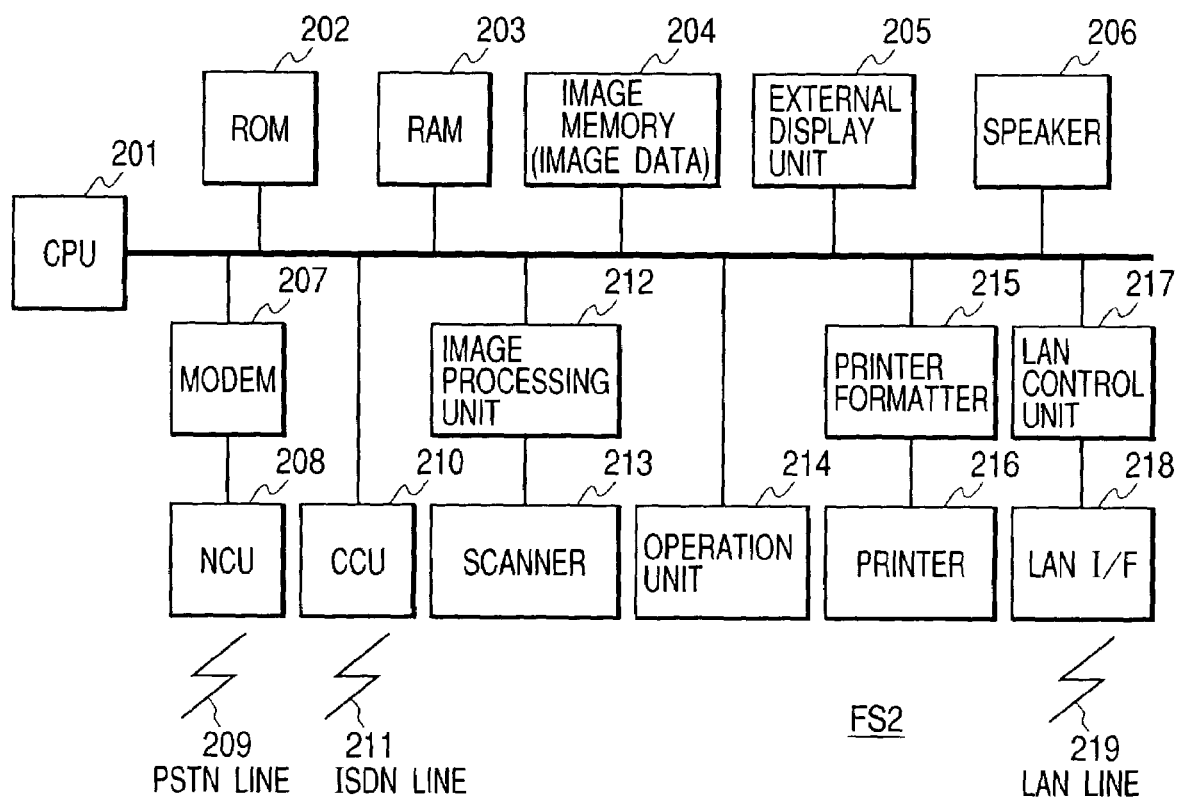
FIG. 7 is a block diagram showing the structure of a facsimile apparatus FS2 according to the second embodiment of the present invention.

FIG. 7 is a block diagram showing the structure of a facsimile apparatus FS2 according to the second embodiment of the present invention.

In the facsimile apparatus FS2, a CPU 201 is a system controlling unit which controls the overall apparatus, a ROM 202 stores control programs for the CPU 201, and a RAM 203 which is composed by an SRAM and the like stores program control variables and the like. Also, a transmission destination telephone number, an electronic mail address, various setting values, administration data of the apparatus, and various working buffers are stored in the RAM 203.

A memory (image memory) 204 which is composed of a DRAM and the like stores and accumulates image data, and an external display unit 205 which is composed of an LCD, an LED or the like displays notification and warning to a user, and monitors a signal sound transmitted and received through a PSTN communication line 209 or an ISDN communication line 211.

A modem 207 modulates and demodulates transmission and reception signals of the facsimile apparatus FS2, and an NCU 208 has the function to send a selection signal (dial pulse or tone dialer) to the PSTN communication line (analog public communication line network) 209. The NCU 208 also performs an automatic reception operation by detecting a calling signal. A CCU 210 performs communication line control to connect with the ISDN communication line (integrated digital communication network) 211.

An image processing unit 212 performs a correction process to the read image data and outputs high-definition image data, and a scanner 213 which is composed of a CS image sensor, a sheet feeding mechanism and the like optically reads an original and then converts the read original into electrical image data. An operation unit 214 which is composed of a keyboard, a touch panel or the like is used when the operator performs various input operations.

A printer formatter 215 analyzes a printer description language and converts the analyzed language into image data when file data sent from an external apparatus such as a PC, a work station or the like is printed. A printer 216 is the apparatus which records the received image and the file data on a recording sheet.

A LAN I/F 218 is the interface which connects the facsimile apparatus FS2 with a LAN communication line 219 through which an electronic mail and the like can be exchanged, and which is controlled by a LAN controlling unit 217.

It should be noted that the modem 207, the NCU 208, the CCU 210, the LAN controlling unit 217 and the LAN I/F 218 are detachably mounted on the facsimile apparatus FS2. That is, if the LAN controlling unit 217 and the LAN I/F 218 are removed from the facsimile apparatus FS2, it works as the facsimile apparatus FS2 which includes only two communication lines of the PSTN communication line and the ISDN communication line. Then, if the CCU 210 is further removed, it works as the facsimile apparatus FS2 which includes only one communication line of the PSTN communication line.

Here, the case where it is discriminated based on such flow charts as shown in FIGS. 2 to 6 that the three communication lines respectively functioning as the PSTN communication line, the ISDN communication line and the LAN communication line are connected with the facsimile apparatus FS2, and the communication line names of these lines are registered respectively as "PSTN", "ISDN" and "LAN" will be explained.

The facsimile apparatus FS2 includes the three communication lines of the PSTN communication line 209, the ISDN communication line 211 and the LAN communication line 219. In these lines, the PSTN communication line 209 and the ISDN communication line 211 are the communication lines used for the facsimile communication, and the LAN communication line 219 is the communication line used for the electronic mail. Incidentally, there are two methods of designating a communication partner, that is, one is to previously register the partner's telephone number and mail address to a one-touch dial or an abbreviated dial, and then depressing the corresponding one-touch dial or inputting the corresponding abbreviated number. The other is to directly input the partner's telephone number and mail address by using numerical keys.

Moreover, the operation unit 214 includes a communication line selection key for selecting the communication line. If the operator depresses the communication line selection key in the communication operation, the communication line can be selected. In the facsimile apparatus FS2, since any one of the PSTN communication line, the ISDN communication line and the LAN communication line is automatically selected as default when the facsimile apparatus FS2 starts operating, the communication can be performed by using any one of the communication lines even if the communication line selection key is not depressed.

Next, an operation to be performed after the communication line selection key on the facsimile apparatus FS2 is depressed will be explained.

Figure 8:
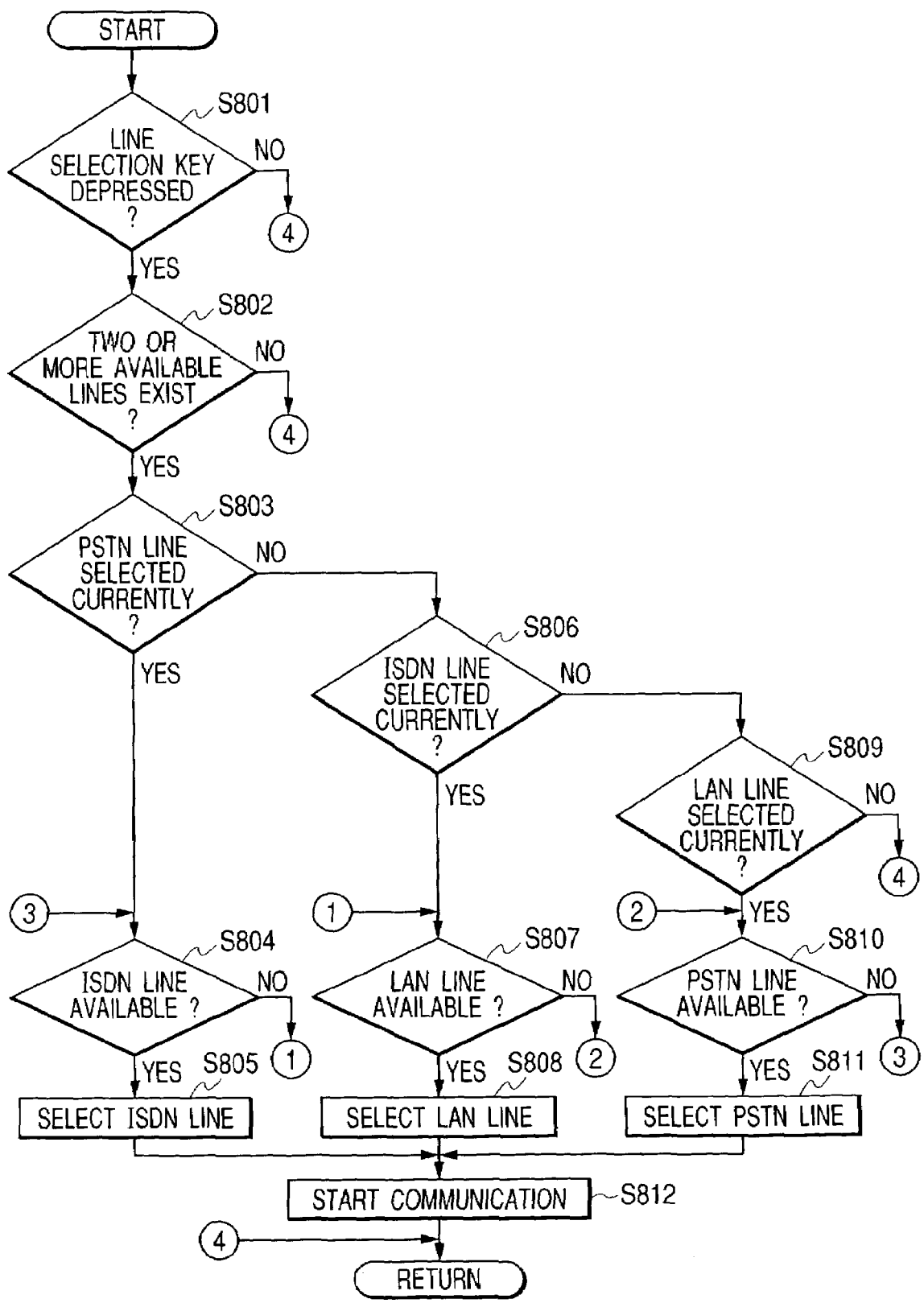
FIG. 8 is a flow chart showing an operation to be performed after a communication line selection key on the facsimile apparatus FS2 is depressed.

FIG. 8 is a flow chart showing the operation to be performed after the communication line selection key on the facsimile apparatus FS2 is depressed.

First, it is discriminated by the CPU 201 whether or not the communication line selection key is depressed by the operator (step S801). If the key is not depressed, the process ends.

Next, if the communication line selection key is depressed by the operator, it is further discriminated based on the control program stored in the ROM 202 whether the plural available communication lines exist (step S802).

In the facsimile apparatus FS2, in case of discriminating whether or not the PSTN communication line is available, this discrimination is performed according to whether or not the modem 207 exists. In case of discriminating whether or not the ISDN communication line is available, this discrimination is performed according to whether or not the CCU 210 exists. Moreover, in case of discriminating whether or not the LAN communication line is available, this discrimination is performed according to whether or not the LAN controlling unit 217 exists.

However, in case of discriminating whether or not each communication line is available, it is possible for the operator to previously set use or disuse of for each communication line and perform the discrimination according to the set contents. Moreover, it is possible to perform the discrimination according to whether or not the communication line in question is currently busy.

If discriminated in the step S802 that the plural available communication lines do not exist, the process ends without any operation. However, in this case, although not shown in the flow chart of FIG. 8, it is possible to display such a fact on the external display unit 205 or generate a warning sound from the speaker 206 to notify the operator that the communication line can not be selected.

On the other hand, if discriminated in the step S802 that the plural available communication lines exist, the communication line is selected according to the communication line just being selected.

That is, it is first discriminated whether or not the communication line just being selected is the PSTN communication line (step S803). If the communication line just being selected is the PSTN communication line, it is further discriminated whether or not the ISDN communication line is available (step S804). If discriminated that the ISDN communication line is available, the state that the PSTN communication line is being selected is changed to the state that the ISDN communication line is selected, by the depression of the communication line selection key (step S805). At this time, the communication line name "ISDN" determined according to such flow charts as shown in FIGS. 2 to 6 is displayed on the external display unit 205, whereby the operator can easily discriminate which line is selected.

Thus, since the ISDN communication line is selected, a calling operation is performed for the ISDN communication line (i.e., a setup message is transmitted to an exchanger), and then the communication starts according to a standard for the ISDN communication line (step S812). For example, the image information read by the scanner 213 is communicated according to a G4 facsimile standard.

On the other hand, if discriminated in the step S804 that the ISDN communication line is not available, then it is discriminated whether or not the LAN communication line is available (step S807). If discriminated that the LAN communication line is available, the state that the PSTN communication line is being selected is changed to the state that the LAN communication line is selected, by the depression of the communication line selection key (step S808). At this time, the communication line name "LAN" determined according to such flow charts as shown in FIGS. 2 to 6 is displayed on the external display unit 205, whereby the operator can easily discriminate which line is selected.

Since it has been already discriminated in the step S802 that the plural available communication lines exist, when the communication line just being selected is the PSTN communication line, if discriminated in the step S804 that the ISDN communication line is not available, there can be no case where it is discriminated in the step S807 that the LAN communication line is not available.

If discriminated in the step S803 that the communication line just being selected is not the PSTN communication line, it is further discriminated whether or not the communication line just being selected is the ISDN communication line (step S806). If discriminated that the communication line just being selected is the ISDN communication line, then it is further discriminated whether or not the LAN communication line is available (step S807).

Here, if discriminated that the LAN communication line is available, the LAN communication line is selected (step S808). At this time, the communication line name "LAN" determined according to such flow charts as shown in FIGS. 2 to 6 is displayed on the external display unit 205, whereby the communication starts according to a protocol for the LAN communication line (TCP/IP or the like) (step S812). For example, the image information read by the scanner 213 is communicated according to an electronic mail standard.

If discriminated in the step S807 that the LAN communication line is not available, it is then discriminated whether or not the PSTN communication line is available (step S810). If discriminated that the PSTN communication line is available, the PSTN communication line is selected (step S811). At this time, the communication line name "PSTN" determined according to such flow charts as shown in FIGS. 2 to 6 is displayed on the external display unit 205. Thus, since the PSTN communication line is selected, a calling operation is performed for the PSTN communication line, and then the communication starts according to a standard for the PSTN communication line (step S812). For example, the image information read by the scanner 213 is communicated according to a G3 facsimile standard.

On the other hand, if discriminated in the step S806 that the communication line just being selected is not the ISDN communication line, it is further discriminated whether or not the communication line just being selected is the LAN communication line (step S809). If discriminated that the communication line just being selected is the LAN communication line, then it is further discriminated whether or not the PSTN communication line is available (step S810). If discriminated that the PSTN communication line is available, the PSTN communication line is selected (step S811). At this time, the communication line name "PSTN" determined according to such flow charts as shown in FIGS. 2 to 6 is displayed on the external display unit 205. On the other hand, if discriminated in the step S810 that the PSTN communication line is not available, it is further discriminated whether or not the ISDN communication line is available (step S804), and then the same operation as above is performed.

Although it is usually impossible that the negative discrimination is performed in any of the steps S803, S806 and S809, the process directly ends in consideration of the case where the state of the system changes during the operation. In this case, in order to notify the operator that an error occurs, it is possible to display such a fact on the external display unit 205 or generate a warning sound from the speaker 206.

By the above operation, the usable communication lines can be selected in sequence by depressing the communication line selection key. That is, for example, if the PSTN communication line, the ISDN communication line and the LAN communication line are all available, the communication lines can be selected in the order of PSTN communication line→ISDN communication line→LAN communication line→PSTN communication line→ . . . , by repeatedly depressing the communication line selection key. Moreover, since the name of the communication line just being selected is displayed, the user can easily know which line is being selected.

In the present embodiment, the case of discriminating that the one PSTN communication line, the one ISDN communication line and the one LAN communication line are respectively connected and registering the discriminated communication lines respectively as "PSTN", "ISDN" and "LAN" is explained, but the present invention is not limited to this. That is, for example, if the two PSTN communication lines and the one ISDN communication line are connected, these lines are named, respectively, as "PSTN: 1", "PSTN: 2" and "ISDN". The present invention is applicable also to such a case, by replacing "PSTN", "ISDN" and "LAN" in the steps of FIG. 8 with "PSTN: 1", "PSTN: 2" and "ISDN", respectively.

Moreover, if the total two communication lines composed of the one PSTN communication line and the one LAN communication line are connected according to the flow charts as shown in FIGS. 2 to 6, these lines are named respectively as "FAX" and "LAN". Moreover, even in that case, if only the two communication lines of the PSTN communication line and the LAN communication line are available, similarly, the communication lines used in the communication can be selected in the order of PSTN communication line→LAN communication line→PSTN communication line→ . . . , and further the names of the lines just being selected are displayed, respectively, as "FAX" and "LAN".

As above, even if the combination of the type of lines and the number of lines changes, flexible measures can be achieved.

In the present embodiment, the facsimile apparatus FS2 includes the total three communication lines composed of the PSTN communication line, the ISDN communication line and the LAN communication line. However, the same operation as that in the facsimile apparatus FS2 is applicable even to a system with which the plural PSTN communication lines can be connected or a system with which the plural LAN communication lines can be connected.

The above operation is performed by the CPU 201 on the basis of the program stored in the ROM 202 or the RAM 203. But, such a program as above may be stored in various storage media such as a floppy disk™, a hard disk, an optical disk, a magnetooptical disk, a CD-ROM, a DVD-ROM, a memory card and the like, and is read out and loaded into an information processing apparatus such as a computer or the like or the facsimile apparatus FS2 by using a dedicated reading apparatus, to execute the fetched program by the CPU 201.

Moreover, it is possible to apply the facsimile apparatus FS2 to a facsimile apparatus in which a copying function, an electronic filing function, a printer function, a data processing function and the like are mixed with the communication function, a communication apparatus separated from a telephone set, a reading circuit and a recording circuit, or data communication control in the information processing apparatus such as the computer or the like.

It is to be understood that the phraseology or terminology employed therein is for the purpose of description and not of limitation.

While the present invention is described with reference to the structures disclosed herein, it is not confined to the details set forth and this application is intended to cover such modification or changes as may come within the purposes of the improvements or the scope of the following claims.

According to the embodiments of the present invention, in the plural-communication-line-containing apparatus, it is possible to display the appropriate communication line name, cause the operator to easily discriminate the communication line, and control the operational confusion to the minimum.

Moreover, according to the embodiments of the present invention, in the plural-communication-line-containing apparatus, it is possible to cause the operator to select the available communication line without any confusion.

What is claimed is:

1. A communication apparatus capable of containing plural communication lines, comprising:
    communication-line-type discriminating means for discriminating a type of each communication line connected;
    communication-line-number counting means for counting the number of same type of communication lines for each type of communication line;
    communication-line-name determining means for determining a communication line name on the basis of the type of communication line discriminated by said communication-line-type discriminating means and the number of same type of communication lines counted by said communication-line-number counting means; and
    communication-line-name displaying means for displaying the communication line name determined by said communication-line-name determining means.

2. A communication apparatus according to claim 1, wherein said apparatus is a facsimile apparatus.

3. A communcation apparatus according to claim 1, further comprising:
    a communication line selecting key for selecting the communcation line; and
    communication line selecting means for selecting one communication line from among the plural communication lines, according to that an operator depresses said communication line selecting key in a communication operation,
    wherein said communication line selecting means selects another communication line from among the plural communication lines according to that the operator further depresses said communication line selecting key.

4. A communication apparatus according to claim 3, wherein the communication line name of the communication line selected by said communication line selecting means is displayed on the basis of the communication line name determined by said communication-line-name determining means.

5. A communication apparatus capable of connecting plural communication lines, comprising:
    communication-line-name storing means for storing a communication line name input by an operator, for each communication line connected;
    communication-line-name-determining-method selecting means for selecting by the operator a name determining method from either a first name determining method or a second name determining method, each of the methods being for determining the communication line name;
    communication-line-name determining means for determining the communication line name on the basis of the communication line name stored in said communication-line-name storing means in a case where the first name determining method is selected by said communication-line-name-determining-method selecting means and determining the communication line name regardless of the communication line name stored in said communication-line-name storing means in a case where the second name determining method is selected by said communication-line-name-determining-method selecting means; and communication-line-name displaying means for displaying the communication line name determined by said communication-line-name determining means.

6. A communication apparatus according to claim 5, wherein the second name determining method is the method in which the communication line name is automatically determined.

7. A communication line name determining program embodied on a computer readable medium to cause a computer to execute:
   a communication-line-type discriminating procedure of discriminating a type of each communication line connected with a communication apparatus capable of containing plural communication lines;
   a communication-line-number counting procedure of counting the number of same type of communication lines for each type of communication line;
   a communication-line-name determining procedure of determining a communication line name on the basis of the type of communication line discriminated in said communication-line-type discriminating procedure and the number of same type of communication lines counted in said communication-line-number counting procedure; and
   a communication-line-name displaying procedure of displaying the communication line name determined in said communication-line-name determining procedure.

8. A communication line name determining program embodied on a computer readable medium to cause a computer to execute:
   a communication-line-name storing procedure of storing a communication line name input by an operator, for each communication line connected with a communication apparatus capable of connecting plural communication lines;
   a communication-line-name-determining-method selecting procedure of selecting by the operator a name determining method from either a first name determining method or a second name determining method, each of the methods being for determining the communication line name;
   a communication-line-name determining procedure of determining the communication line name on the basis of the communication line name stored in said communication-line-name storing procedure in a case where the first name determining method is selected in said communication-line-name-determining-method selecting procedure and determining the communication line name regardless of the communication line name stored in said communication-line-name storing procedure in a case where the second name determining method is selected in said communication-line-name-determining-method selecting procedure; and
   a communication-line-name displaying procedure of displaying the communication line name determined in said communication-line-name determining procedure.

9. A communication line name determining program embodied on a computer readable medium according to claim 8, wherein the second name determining method is the method in which the communication line name is automatically determined.

10. A communication apparatus capable of connecting with plural communication lines for facsimile communication and a LAN communication line, comprising:
    a communication line selecting key for selecting the communication line; and
    communication line selecting means for selecting one communication line from among the plural communication lines for facsimile communication and a LAN communication line, according to that an operator depresses said communication line selecting key in a communication operation,
    wherein said communication line selecting means selects another communication line from among the plural communication lines for facsimile communication and a LAN communication line according to that the operator further depresses said communication line selecting key.

11. A communication apparatus according to claim 10, further comprising:
    communication-line-type discriminating means for discriminating a type of each communication line connected with the communication apparatus;
    communication-line-name determining means for determining a communication line name on the basis of the type of communication line discriminated by said communication-line-type discriminating means; and
    communication-line-name displaying means for displaying the communication line name corresponding to the selected communication line and determined by said communication-line-name determining means, by depressing said communication line selecting key.

12. A communication apparatus according to claim 10, further comprising:
    communication-line-name storing means for storing a communication line name input by the operator, for each communication line connected; and
    communication-line-name displaying means for displaying the communication line name corresponding to the selected communication line and stored in said communication-line-name storing means, by depressing said communication line selecting key.

13. A communication apparatus according to claim 10, further comprising:
    communication-line-name storing means for storing a communication line name input by the operator, for each communication line connected;
    communication-line-name-determining-method selecting means for selecting by the operator a name determining method from either a first name determining method or a second name determining method, each of the methods being for determining the communication line name;
    communication-line-name determining means for determining the communication line name on the basis of the communication line name stored in said communication-line-name storing means in a case where the first name determining method is selected by said communication-line-name-determining-method selecting means and determining the communication line name regardless of the communication line name stored in said communication-line-name storing means in a case where the second name determining method is selected by said communication-line-name-determining-method selecting means; and
    communication-line-name displaying means for displaying the communication line name corresponding to the selected communication line and determined by said communication-line-name determining means, by depressing said communication line selecting key.

14. A communication apparatus capable of connecting with plural communication lines for facsimile communication and a LAN communication line, comprising:
    a communication line selecting key for selecting the communication line;

communication-line-state discriminating means for discriminating whether or not each communication line is available; and communication line selecting means for selecting one communication line from among the communication lines for facsimile communication and a LAN communication line discriminated as available by said communication-line-state discriminating means, according to that an operator depresses said communication line selecting key in a communication operation, wherein said communication line selecting means selects another communication line from among the plural communication lines for facsimile communication and a LAN communication line according to that the operator further depresses said communication line selecting key.

15. A communication apparatus according to claim 14, wherein the plural communication lines for facsimile communication include a PSTN line and an ISDN line, and wherein the LAN communication line is for an electronic mail communication.

16. A communication line selecting program embodied on a computer readable medium for causing a computer to execute:
a procedure of discriminating whether or not a communication line selecting key for selecting the communication line is operated;
a procedure of selecting one communication line from among the plural communication lines for facsimile communication and a LAN communication line by discriminating that the communication line selecting key is depressed; and
a procedure of selecting another communication line from among the plural communication lines for facsimile communication and a LAN communication line by discriminating that the communication line selecting key is further depressed.

17. A communication line selecting program embodied on a computer readable medium according to claim 16, wherein said program causes the computer to further execute:
a communication-line-type discriminating procedure of discriminating a type of each communication line connected;
a communication-line-name determining procedure of determining a communication line name on the basis of the type of communication line discriminated in said communication-line-type discriminating procedure; and
a communication-line-name displaying procedure of displaying the communication line name corresponding to the selected communication line and determined in said communication-line-name determining procedure, by depressing the communication line selecting key.

18. A communication line selecting program embodied on a computer readable medium according to claim 16, wherein said program causes the computer to further execute:
a communication-line-name storing procedure of storing a communication line name input by an operator, for each communication line connected; and
a communication-line-name displaying procedure of displaying the communication line name corresponding to the selected communication line and stored in said communication-line-name storing procedure, by depressing said communication line selecting key.

19. A communication line selecting program embodied on a computer readable medium according to claim 16, wherein said program causes the computer to further execute:

a communication-line-name storing procedure of storing a communication line name input by an operator, for each communication line connected;
a communication-line-name-determining-method selecting procedure of selecting by the operator a name determining method from either a first name determining method or a second name determining method, each of the methods being for determining the communication line name;
a communication-line-name determining procedure of determining the communication line name on the basis of the communication line name stored in said communication-line-name storing procedure in a case where the first name determining method is selected by said communication-line-name-determining-method selecting means and determining the communication line name regardless of the communication line name stored in said communication-line-name storing means in a case where the second name determining method is selected in said communication-line-name-determining-method selecting procedure; and
a communication-line-name displaying procedure of displaying the communication line name corresponding to the selected communication line and determined in said communication-line-name determining procedure, by depressing the communication line selecting key.

20. A communication line selecting program embodied on a computer readable medium for causing a computer to execute:
a procedure of discriminating whether or not a communication line selecting key for selecting the communication line is operated;
a communication-line-state discriminating procedure of discriminating whether or not each communication line is available;
a procedure of selecting one communication line from among the communication lines for facsimile communication and a LAN communication line discriminated as available in said communication-line-state discriminating procedure, by discriminating that the communication line selecting key is depressed; and
a procedure of selecting another communication line from among the plural communication lines for facsimile communication and a LAN communication line by discriminating that the communication line selecting key is further depressed.

21. A communication line selecting program embodied on a computer readable medium according to claim 20, wherein the plural communication lines for facsimile communication include a PSTN line and an ISDN line, and wherein the LAN communication line is for an electronic mail communication.

22. A communication apparatus capable of containing plural communication lines, comprising:
a communication-line-type discriminating unit for discriminating a type of each communication line connected;
a communication-line-number counter for counting the number of same type of communication lines for each type of communication line;
a communication-line-name determining unit for determining a communication line name on the basis of the type of communication line discriminated by said communication-line-type discriminating unit and the number of same type of communication lines counted by said communication-line-number counter; and a communication-line-name displaying unit for displaying the communication line name determined by said communication-line-name determining unit.

23. A communication apparatus capable of connecting plural communication lines, comprising:

a communication-line-name memory for storing a communication line name input by an operator, for each communication line connected;

a communication-line-name-determining-method selecting unit for selecting by the operator a name determining method from either a first name determining method or a second name determining method, each of the methods being for determining the communication line name;

a communication-line-name determining unit for determining the communication line name on the basis of the communication line name stored in said communication-line-name memory in a case where the first name determining method is selected by said communication-line-name-determining-method selecting unit and determining the communication line name regardless of the communication line name stored in said communication-line-name memory in a case where the name determining method is selected by said communication-line-name-determining-method selecting unit; and a communication-line-name displaying unit for displaying the communication line name determined by said communication-line-name determining unit.

24. A communication apparatus capable of connecting with plural communication lines for facsimile communication and a LAN communication line, comprising:

a communication line selecting key for selecting the communication line; and a communication line selecting unit for selecting one communication line from among the plural communication lines for facsimile communication and a LAN communication line, according to that an operator depresses said communication line selecting key in a communication operation, wherein said communication line selecting unit selects another communication line from among the plural communication lines for facsimile communication and a LAN communication line according to that the operator further depresses said communication line selecting key.

* * * * *